Jan. 2, 1968   A. T. HILDEBRAND ET AL   3,361,230
MANUAL ADJUSTER MEANS FOR AUTOMATIC SLACK ADJUSTER
Filed Dec. 13, 1965   2 Sheets-Sheet 2

INVENTORS
ALEXANDER T. HILDEBRAND
BRUCE E. LATVALA

BY
Scrivener Parker Scrivener & Clarke
ATTORNEYS 3,361,230
MANUAL ADJUSTER MEANS FOR AUTOMATIC
SLACK ADJUSTER
Alexander T. Hildebrand and Bruce E. Latvala, Elyria, Ohio, assignors to Bendix-Westinghouse Automotive Air Brake Company, Elyria, Ohio
Filed Dec. 13, 1965, Ser. No. 513,432
6 Claims. (Cl. 188—79.5)

This invention relates to automatic slack adjusters for vehicle brakes and more particularly to manual adjusting means for automatic slack adjusters of the type utilizing cooperating primary and secondary worms and worm gears to effect slack take-up upon movement of the brakes beyond its normal range of operation due to brake wear.

The present invention involves a slack adjuster substantially similar to that shown and claimed in the copending application of Hildebrand et al., Ser. No. 467,936 filed June 29, 1965 and assigned to the same assignee as the present invention. In the co-pending application a tusk or tooth integral with a driver ratchet carried by the slack adjuster body extends into a slot in a relatively stationary member. When movement of the slack adjuster exceeds a pre-determined amount the tusk engages a spaced wall of the slot to rotate the drive ratchet an increment of one ratchet tooth and upon release of the brake, the tusk is rotated in the reverse direction to its original position and in so doing causes the drive ratchet to engage a driven ratchet mounted on and connected to a small or secondary worm by means of a spline to rotate through a secondary worm gear and a primary worm, a primary worm gear engaging the brake came shaft to move the latter an increment in a slack take-up direction.

Though the described slack adjuster is satisfactory in every respect, it has been found that whenever manual adjustment is required, for example, following brake shoe replacement, manual rotation of the secondary worm is a tedious and time-consuming operation and it is the broad object of the present invention to provide in a slack adjuster of the type described means for effecting rapid manual adjustment of the brake whenever this is necessary.

More particularly, it is an object of the present invention to accomplish the foregoing by providing novel means interposed between the primary and secondary gear sets for temporarily disconnecting the secondary set from the primary set while at the same time only the primary set is actuated to effect rapid manual adjustment of the brake.

Other objects and their attendant advantages will become apparent as the following detailed description is read in conjunction with the accompanying drawings wherein:

FIG. 5 is a vertical cross-sectional view taken substantially on the line 5—5 of FIG. 4.

Figure 1:
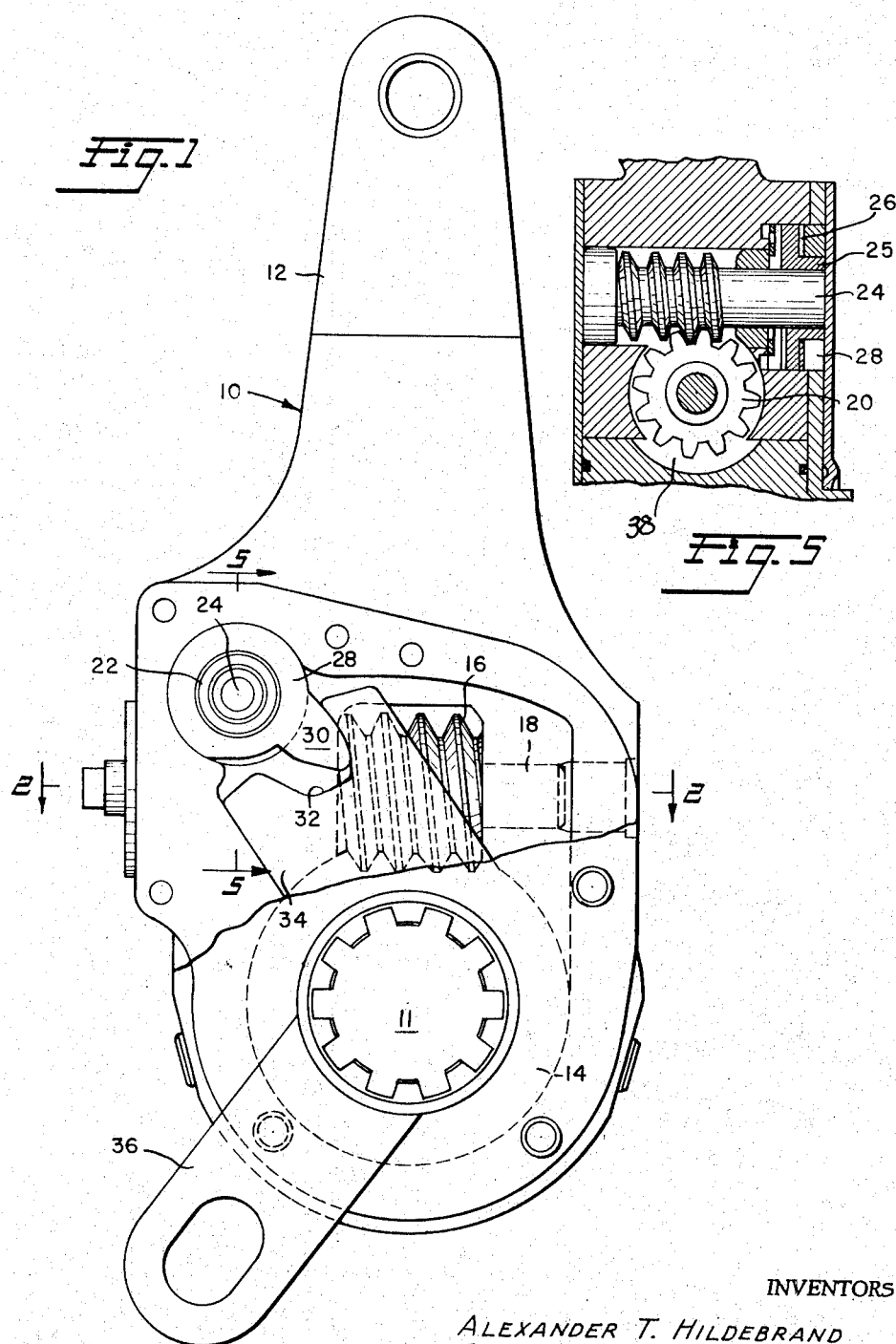
FIG. 1 is a side elevational view of a slack adjuster incorporating features of the present invention.

Referring now to the drawings and particularly to FIG. 1 there is illustrated a slack adjuster generally similar in construction and mode of operation to the adjuster described and claimed in the aforementioned co-pending application, Ser. No. 467,936 and to which reference is made for a detailed description.

Briefly, the adjuster of FIG. 1 comprises a body 10 having an upwardly extending arm 12 which is adapted to be connected to a brake actuator. The lower end of the body 10 has a bore 11 therethrough and carries a centrally splined primary worm gear 14 which is engaged by a primary worm 16 carried on a shaft 18 at right angles to the bore and carrying at one end a secondary worm gear 20 engaged by a secondary worm 22 mounted on a shaft 24 which is drivably connected at one end to a driven ratchet 25 whose teeth cooperate with a drive ratchet 26 integral with a rotatable member 28.

The member 28 carries a tooth or tusk 30 which extends into an oversized slot 32 in a relatively fixed member 34 which is mounted on the slack adjuster co-axially with the splined opening 11 in the worm gear 14 but is prevented from moving with the slack adjuster upon brake operation by an arm 36 which is connected to a relatively stationary part of the vehicle.

In operation, when the adjuster 10 is moved to the left in FIG. 1 a greater than normal distance the tooth 30 engages the left hand side of the slot 32 causing the drive ratchet member 28 to rotate counter clockwise an increment of one ratchet tooth so that upon release of the brake the tooth 30 engages the opposite side of the slot to effect rotation of the driven ratchet and hence the secondary worm gear 22, 20 and eventually the primary worm gear 14 to reduce slack.

Heretofore, whenever it has been necessary to manually actuate the adjusting mechanism it has been the general practice to depress a plunger carrying the driven ratchet so that the latter is disengaged from the drive ratchet whereupon a suitable tool may be engaged with a projecting end of the shaft carrying the secondary worm which can then be rotated to actuate the entire gear train until the cam shaft has been rotated to the desired position.

Figure 2:
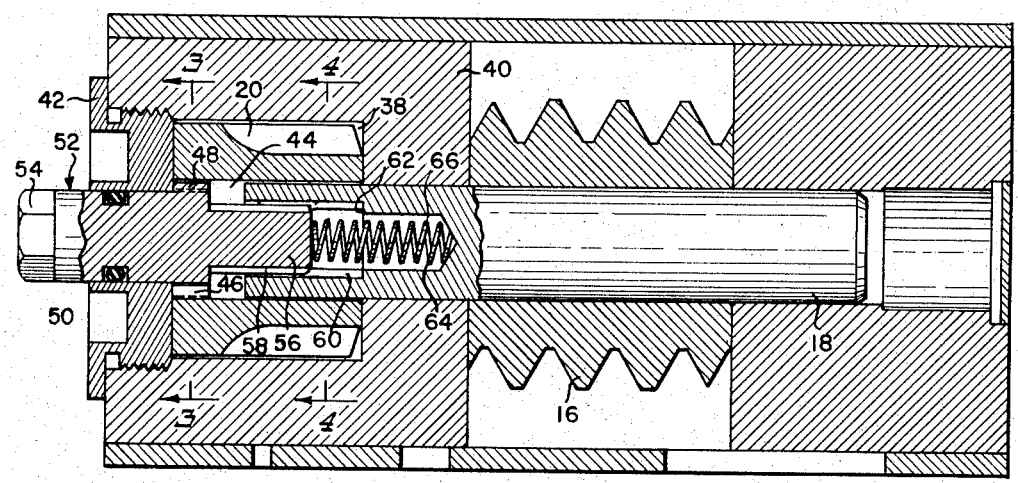
FIG. 2 is an enlarged cross-sectional view taken substantially on the line 2—2 of FIG. 1.
Figure 3:
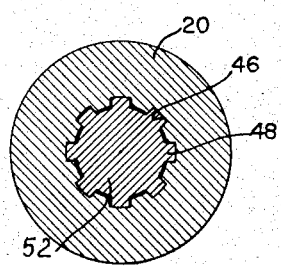
FIG. 3 is a vertical cross-sectional view taken substantially on the line 3—3 of FIG. 2.
Figure 4:
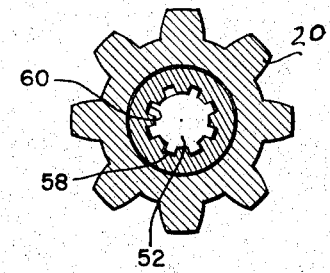
FIG. 4 is a vertical cross-sectional view taken substantially on the line 4—4 of FIG. 2.

In accordance with the present invention, rotation of the entire gear train to effect proper positioning of the cam shaft is not resorted to but rather means are provided for disconnecting the secondary worm and gear from the primary worm and gear and merely operating the latter independently of the former until the cam shaft is properly positioned. With reference now to FIG. 2 it will be noted that the secondary worm gear 20 is received in a cavity 38 formed in a portion 40 of the adjuster and closed by a centrally apertured closure member 42. The worm gear 20 is centrally bored to provide a passage 44 therethrough with the left end thereof in FIG. 2 being provided with internal teeth or splines 46 of limited axial extent and which are normally engaged by external teeth or spline part 48 carried adjacent the outer end 50 of a plunger 52 which extends outwardly of the closure member 42 and is provided with a polygonal head part 54 adapted to receive a suitable tool, such as a wrench, to effect manual rotation of the plunger 52.

The right hand end 56 of the plunger 52 is of reduced diameter and carries an external spline part 58 slidably engaging internal splines 60 in a counter bore 62 at the left hand end of the aforementioned shaft 18 carrying the primary worm 16. The right hand end of the counter bore 62 in the shaft 18 is recessed as at 64 to receive a spring 66 which reacts against the bottom of the recess and on to the right hand end of the plunger 56 to urge it at all times to its left hand position of FIG. 2 wherein its teeth 48 engage the internal teeth 46 of the worm gear 20 so that when the latter is rotated during automatic brake adjustment as previously described, it imparts rotation to the primary worm 16 through the splines 46, 48 on the plunger 52 and worm gear 20, respectively, and the splines 58, 60 on the right hand end of the plunger 52 and in the counter bore 62 of the primary worm shaft 18. Obviously, the left hand end of the shaft 18 could be of reduced diameter and externally splined to fit in an internally splined counter bore in the plunger without departing in any way from the invention.

In the event that it becomes necessary to reposition the cam shaft manually, in accordance with the invention this is effected by pushing inwardly on the plunger 52 until its teeth 48 are moved to the right into the bore 44 out of engagement with the internal splines 46 of the secondary worm gear 20 and thereafter a tool applied to the head 54 of the plunger 52 may be rotated to turn through the splines 58, 60 the shaft 18 and primary worm 16 to rotate the primary worm gear 14 until the cam shaft has been properly positioned. It will be seen that when the plunger 52 is moved to the right it effectively disconnects the secondary worm and gear from the primary worm and gear so that the latter may be operated entirely independently of the former and much more rapidly than would ever be possible through manual operation of the secondary worm.

Upon release of the plunger 52 it is moved by the spring 66 to the left hand position of FIG. 2 wherein the primary and secondary gear trains are again interconnected for automatic operation as previously described.

Those skilled in the art will recognize that the invention is susceptible of a variety of changes and modifications without however departing from the scope and spirit of the appended claims.

What is claimed is:

1. In an automatic vehicle brake slack adjuster including a body having an upstanding arm adapted to be connected to a brake actuator, a central bore in the body, an internally splined worm gear in said bore and adapted to receive therethrough a brake actuating cam shaft, a shaft in said body, a primary worm carried by said shaft and operatively engaging said primary worm gear, a secondary worm gear in said body, a secondary worm operatively engaged with said secondary worm gear, and means carried by said body and automatically responsive to greater-than-normal movement of said body in a brake applying direction for incrementally rotating said secondary worm, the invention which comprises releasable means normally operatively interconnecting said primary worm shaft and said secondary worm gear, means for selectively actuating said releasable means to disconnect said secondary worm gear and said primary worm shaft, and means for manually rotating said primary worm shaft to effect rotation of said primary worm and worm gear independently of said secondary worm and worm gear upon operation of said releasable means to disconnect said secondary worm gear from said primary worm gear shaft.

2. In the adjuster of claim 1 wherein said releasable means includes a passage through said secondary worm gear in axial alignment with an end of said primary worm shaft, internal splines of limited axial extent in said passage, a rotatable plunger having external splines normally engaging said internal splines, said plunger being capable of movement in an axial direction relative to said worm gear to disengage the respective internal and external splines, and means slidably but non-rotatably connecting said plunger and said shaft whereby said plunger is at all times drivingly connected with said shaft irrespective of the engagement or disengagement of said external and internal splines.

3. In the adjuster of claim 2 wherein the slidable connecting means between said shaft and said plunger includes an internally splined counter-bore in one of said members, and external splines integral with the other of said members and slidably received within the internal splines of said counter-bore.

4. In the adjuster of claim 2 including resilient means releasably urging said plunger to a position wherein the respective internal and external splines are normally engaged.

5. In the adjuster of claim 4 wherein said plunger is movable inwardly in opposition to said resilient means until the external splines normally engaging said internal splines are clear thereof.

6. In the adjuster of claim 3 wherein the axial length of the external splines extending into said counter-bore is less than the axial length of the latter and the internal splines thereof whereby upon axial movement of said plunger the splines thereof are in continuous engagement with the splines on said shaft, and wherein the means for manually rotating said primary worm shaft comprises an end part on said plunger projecting outwardly of said body, and means on said end part adapted to receive a tool for effecting the rotation of said primary worm gear shaft through the respective continuously engaged spline on said plunger and said shaft.

References Cited

UNITED STATES PATENTS 3,261,433   7/1966   Page _____ 188—79.5

DUANE A. REGER, *Primary Examiner.*